Patented June 19, 1951

2,557,397

UNITED STATES PATENT OFFICE 2,557,397

METHOD OF TREATING GLUTEN

Charles W. Stewart, River Forest, Ill., assignor to Corn Products Refining Company, New York, N. Y., a corporation of New Jersey No Drawing. Application April 14, 1950, Serial No. 156,053

8 Claims. (Cl. 260—112)

This invention relates to a process for extracting substantially all of the protein (referred to as whole protein) contained in crude corn or sorghum gluten. Such crude glutens, as are obtained in the wet milling of grain, commonly contain 40 per cent to 70 per cent of true gluten protein along with considerable proportions of starch, fiber, oil and ash.

Heretofore, protein has been extracted from such glutens by means of aqueous solutions of alkaline materials such as sodium hydroxide. This method has the disadvantage that when sufficient alkali is used to peptize most of the protein, the starch in the gluten becomes gelatinized by the action of the alkali, and then the separation of starch and protein is not feasible. If less alkali than is required to peptize the protein is used and gelatinization of the starch is avoided, then it is not possible to extract all of the protein from the gluten.

An object of the present invention is to provide an improved method of obtaining whole protein from corn or sorghum gluten. A further object is to provide a method which is economical and gives a high yield of protein. A further object is to provide a method whereby gelatinization of starch is avoided, and substantially complete extraction of the protein may be effected. Other objects will appear hereinafter.

These and other objects are accomplished by treating an aqueous slurry of gluten with a mixture of an alkali and a sulfide or sulfhydrate from the group consisting of sodium sulfide, potassium sulfide and ammonium sulfide.

In carrying out the process of the present invention, corn gluten or sorghum gluten in the form of thickened gluten, press cake, or any of the dry forms of gluten, such as spray-, flash- or fire-dried gluten is slurried in water at a concentration of 3 per cent to 15 per cent dry substance. Five per cent to 10 per cent dry substance in the slurry is preferred but higher concentrations may be used, depending upon the equipment available to separate the extracted protein from the residue. Thereafter, a mixture of the sulfide (sodium sulfide being preferred) and alkali is added. The sodium or other sulfide should be present to the extent of 2 per cent to 8 per cent, based on protein dry substance. Sufficient sodium or potassium hydroxide should be used to adjust the pH to 12.0 to 12.6. Usually about 15 per cent of sodium hydroxide, based on protein dry substance, is required for this adjustment.

The slurry is then maintained at a temperature of 40° C. to 50° C. for about 20 minutes to one hour to extract the protein. If the temperature rises above 50° C., the starch present in the gluten will gelatinize and interfere with separation of the extracted protein from the residue. On the other hand, if the temperature is below 40° C., the time for the extraction to take place will be increased.

The time for the heating should not exceed about one hour. If longer times are used, the amount of protein extracted is not increased and undesirable chemical changes in the protein may take place when long extraction times are used. The preferred time is 20 minutes to 30 minutes.

After the extraction period, insoluble material is removed as by centrifugation or filtration. The clarified extract may have a green color, in which case, after adjustment to suitable pH, may be treated with a small amount of an oxidizing agent, as, for example, sodium chlorite or hydrogen peroxide to effect color removal. About 1.5 per cent of each sodium chlorite and about 2.0 per cent of hydrogen peroxide, based on the protein, gives satisfactory results. The optimum pH for bleaching with sodium chlorite is about 4.5 to 5.0; and for hydrogen peroxide 7.0 to 7.5, although the bleaching will occur as high as pH 12.0. When the pH is within the range of 4.5 to 5.0 precipitation of the protein may occur, as will be described hereinafter, but this will not interfere with the bleaching process. The bleaching may be effected at room temperature or at the temperature at which extraction was carried out. The time required is ordinarily not more than 10 minutes, although this may vary according to the extent to which bleaching is desired.

The next step is to precipitate the protein from solution. This is accomplished by adjusting the pH of the solution to 4.0 to 5.5 (the preferred range being 4.5 to 4.7) by means of an acid, hydrochloric or sulfuric being suitable. This may be done at room temperature, but the precipitate is finely divided. While this precipitate settles readily by gravity or by centrifuging, it is difficult to filter. Optimum precipitation is obtained when the concentration of the protein is 5 per cent to 7 per cent and the temperature is between 50° C. and 55° C. Under such conditions large agglomerates are formed which when cooled to 20° C. to 25° C. may be filtered readily. After filtration or separation by centrifugation, the protein is dried by conventional means.

The following examples, which are intended as informative and typical only and not in a limiting sense, will further illustrate the invention which

EXAMPLE I

*Extraction of whole protein from gluten press cake*

A slurry was made of 130 g. of corn gluten press cake (40 per cent d. s.—61 per cent protein) in 900 ml. of water. Twenty-one ml. of a solution, containing 180 g. sodium hydroxide and 110 g. sodium sulfide per liter, was added, the pH thereby being adjusted to 12.6. The slurry was transferred to an Erlenmeyer flask and heated at 40° C. for 20 minutes. The extract was clarified in a centrifuge at 1500 R. P. M. and filtered through Dicalite filter aid. The residue was washed twice with 200 ml. of water and dried. The filter pad was washed with water, adjusted to pH 12.5, and then the washings combined with the extract. The pH of the extract was adjusted with hydrochloric acid to 4.7 and the precipitated protein was washed and dried. Table I gives the yield data.

*Table I*

|  | Grams | Per cent |
| --- | --- | --- |
| Original nitrogen | 5.02 | 100 |
| Extracted nitrogen | 4.85 | 96.4 |
| Nonprecipitated nitrogen | 0.32 | 6.4 |
| Residue nitrogen | 0.14 | 2.8 |

It has been pointed out above that in the absence of sodium sulfide, the extraction of the protein from gluten is incomplete when the amount of alkali used does not exceed that at which gelatinization of the starch in the gluten occurs. The following example shows the effect on yield of using the maximum amount of alkali without starch gelation to extract the protein from corn gluten.

EXAMPLE II

*Extraction of whole protein from flash-dried gluten with sodium hydroxide*

Eighty-four g. of flash-dried gluten (7.6 per cent N) was slurried in 500 ml. of water and 20 ml. of 5 normal sodium hydroxide to give a pH of 12.1 (maximum without starch gelation). The slurry was heated for one hour at 45° C. and clarified by centrifuge. The residue was re-extracted in 500 ml. of water and the extracts combined and neutralized to pH 4.5. Sixty per cent of the protein was extracted by this procedure.

In Example 1, only 12 per cent sodium hydroxide was used and the yield of protein was 96 per cent, whereas, in Example II, 20 per cent sodium hydroxide was used and the yield was only 60 per cent. If the sodium sulfide is considered in Example I, the total amount of alkali is about the same as in Example II, but substantially all of the protein is extracted and there is no danger of starch gelation.

EXAMPLE III

*Extraction of whole protein from deoiled gluten*

Flash-dried gluten was deoiled by slurrying in 50 per cent alcohol and treating with hexane. The deoiled alcoholic slurry was precipitated in cold water, filtered and leached with four volumes of fresh water to remove the remaining alcohol. One hundred g. of filter cake (46 per cent d. s.—71 per cent protein) was slurried in 800 ml. of water, and 14 ml. of a solution containing 180 g. NaOH and 100 g. Na$_2$S per liter was added to adjust the pH to 12.6. Extraction and clarification were carried out, as outlined, in Example I. Table II gives the yield and analysis of the product.

*Table II*

|  | Grams | Per cent |
| --- | --- | --- |
| Original nitrogen | 5.2 | 100 |
| Extracted nitrogen | 4.9 | 94.2 |
| Nonprecipitated nitrogen | 0.31 | 6.0 |
| Residue nitrogen | 0.10 | 2.0 |

Analysis of the product:

| | Per cent |
| --- | --- |
| Moisture | 2.3 |
| Nitrogen, d. b. | 15.2 |
| Oil, d. b. | 1.3 |
| Carbohydrate, d. b. | 2.0 |

EXAMPLE IV

*Extraction of whole protein from flash-dried gluten*

One hundred g. of flash-dried gluten (62 per cent protein) was dispersed in 2 l. of water and 9 g. of sodium hydroxide and 3.6 g. of sodium sulfide were then added to give a pH of 12.3. The slurry was heated to 50° C. for 20 minutes and centrifuged to remove the insoluble residue. The residue was washed once with one l. of water and sufficient sodium hydroxide to maintain a pH of 12.3. The extracts were combined and neutralized to pH 4.5. The product was recovered, washed and dried.

Ninety per cent of the protein was extracted by this procedure. The finished product contained 5.2 per cent moisture, 9.6 per cent oil, 2 per cent carbohydrate or 88.4 per cent protein, moisture free.

The present invention may be used also to extract glutelin or non-zein type of protein from gluten from which zein has been extracted. Commercial zein is obtained from corn gluten by extracting the gluten with isopropyl alcohol and hexane. The residue may be treated in accordance with the present invention to recover additional protein.

EXAMPLE V

*Extraction of zein residue cake*

Sixty-four g. (dry basis) of residue left after zein was extracted from corn gluten was slurried in 1500 ml. of water. The pH was adjusted to 12.4 by the addition of 30 ml. of a solution containing 180 g. of NaOH and 55 g. Na$_2$S per liter. The slurry was heated to 50° C. and residual alcohol removed under reduced pressure. The extract was clarified by centrifugation and filtration. Then the filtrate was bleached with 3 ml. of 30 per cent hydrogen peroxide at pH 7. The pH was, thereafter, adjusted to 4.5, the resultant precipitate washed and dried.

Table III shows the yield of zein and glutelin type protein obtained from the original gluten.

| | Per cent |
| --- | --- |
| Zein | 53.6 |
| Glutelin | 42.6 |
| Final residue | 2.6 |

I claim:

1. The process of recovering substantially all of the protein contained in a material of the group consisting of crude corn gluten and crude sorghum gluten which comprises extracting the gluten with an aqueous solution of an alkali and an alkali sulfide.

2. The process of recovering substantially all of the protein contained in a material of the group consisting of crude corn gluten and crude sorghum gluten which comprises extracting the gluten with an aqueous solution of an alkali and an alkali sulfide at a pH from about 12.0 to about 12.6.

3. The process of obtaining protein from crude gluten of plant origin from the group consisting of corn gluten and sorghum gluten which comprises extracting the gluten with an aqueous solution of alkali and alkali sulfide; the concentration of the gluten in the system being 3 per cent to 15 per cent dry substance; the concentration of sulfide being 2 per cent to 8 per cent, based on protein dry substance, and the amount of alkali being sufficient to adjust the pH of the system to 12.0 to 12.6; the temperature at which the extraction is carried out being 40° C. to 50° C.

4. The process of obtaining protein from crude gluten of plant origin from the group consisting of corn gluten and sorghum gluten which comprises extracting the gluten with an aqueous solution of alkali and alkali sulfide; the concentration of the gluten in the system being 3 per cent to 15 per cent, dry substance; the concentration of sulfide being 2 per cent to 8 per cent, based on protein dry substance, and the amount of alkali being sufficient to adjust the pH of the system to 12.0 to 12.6; the temperature at which the extraction is carried out being 40° C. to 50° C.; and the time of the extraction not exceeding about one hour.

5. The process of obtaining protein from gluten from crude proteins of plant origin from the group consisting of corn gluten and sorghum gluten which comprises extracting the gluten with an aqueous solution of alkali and sodium sulfide; the concentration of the gluten in the system being 3 per cent to 15 per cent, dry substance; the concentration of sodium sulfide being 2 per cent to 8 per cent, based on protein dry substance, and the amount of alkali being sufficient to adjust the pH of the system to 12.0 to 12.6; the temperature at which the extraction is carried out being 40° C. to 50° C.; and the time of the extraction being 20 minutes to one hour.

6. The process of obtaining protein from corn gluten which comprises treating an aqueous slurry of gluten at a concentration of 3 to 15 per cent, dry substance, with 2 per cent to 8 per cent of alkali sulfide and sufficient alkali hydroxide to adjust the pH of the system to 12.0 to 12.6 at a temperature of 40° C. to 50° C. for a period of time not exceeding about one hour, thereafter, separating the extract from residual material, adjusting the pH of the extract to 4.5 to 4.7 to precipitate protein material therefrom and recovering the protein.

7. The process of obtaining protein from corn gluten which comprises treating an aqueous slurry of gluten at a concentration of 3 to 15 per cent, dry substance, with 2 per cent to 8 per cent of sodium sulfide and sufficient sodium hydroxide to adjust the pH of the system to 12.0 to 12.6 at a temperature of 40° C. to 50° C. for 20 minutes to one hour, thereafter, separating the extract from residual material, adjusting the pH of the extract to 4.5 to 4.7 to precipitate protein material therefrom and recovering the protein.

8. The process of obtaining glutelin from corn gluten from which zein has been removed which comprises extracting said gluten with an aqueous solution of alkali and sodium sulfide; thereafter separating the extract from residual material, adjusting the pH of the extract to 4.5 to 4.7 to precipitate protein material therefrom and recovering the protein; the concentration of the gluten in the system being 3 per cent to 15 per cent, dry substance; the concentration of sodium sulfide being 2 per cent to 8 per cent, based on protein dry substance, and the amount of alkali being sufficient to adjust the pH of the system to 12.0 to 12.6; the temperature at which the extraction is carried out being 40° C. to 50° C.; and the time of the extraction not exceeding about one hour.

CHARLES W. STEWART.

No references cited.